United States Patent
Mutikainen et al.

(10) Patent No.: US 9,300,628 B2
(45) Date of Patent: Mar. 29, 2016

(54) CORRELATING COMMUNICATION SESSIONS

(75) Inventors: Jari Mutikainen, Lepsämä (FI); Miikka Poikselka, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/123,705

(22) PCT Filed: Oct. 10, 2008

(86) PCT No.: PCT/EP2008/008570
§ 371 (c)(1),
(2), (4) Date: Apr. 11, 2011

(87) PCT Pub. No.: WO2010/040373
PCT Pub. Date: Apr. 15, 2010

(65) Prior Publication Data
US 2011/0270995 A1    Nov. 3, 2011

(51) Int. Cl.
*G06F 15/16*    (2006.01)
*H04L 29/12*    (2006.01)
*H04L 29/08*    (2006.01)
*H04L 29/06*    (2006.01)

(52) U.S. Cl.
CPC ...... *H04L 61/2596* (2013.01); *H04L 29/12584* (2013.01); *H04L 61/3095* (2013.01); *H04L 67/306* (2013.01); *H04L 65/1016* (2013.01); *H04L 65/1046* (2013.01); *H04L 65/1069* (2013.01); *H04L 65/1073* (2013.01)

(58) Field of Classification Search
CPC ............. H04M 7/1205; H04L 12/5696; H04L 29/12584; H04L 61/2596; H04L 29/08072
See application file for complete search history.

(56) References Cited

U.S. PATENT DOCUMENTS 8,254,288 B2 *  8/2012 Lindgren et al. ............... 370/254
2003/0235282 A1 * 12/2003 Sichelman et al. ...... 379/201.03
2004/0125768 A1 *  7/2004 Yoon et al. ..................... 370/331

(Continued)

FOREIGN PATENT DOCUMENTS

CN        1561631 A       1/2005
CN      101569218 A      10/2009
WO   WO-2008076015 A1    6/2008

OTHER PUBLICATIONS

3GPP TSG SA WG2 Architecture—S2#56 "Consideration of the relationship between Domain Selection and Personal Network Management" S2-070157.*

(Continued)

*Primary Examiner* — Joshua Joo
*Assistant Examiner* — Younes Naji
(74) *Attorney, Agent, or Firm* — Mintz Levin Cohn Ferris Glovsky and Popeo, P.C.

(57) ABSTRACT

The present invention relates to a session handling entity and an application server (AS) in a communication system, the session handling entity (S-CSCF) is obtaining, from a register entity, a correlation identity for a registering private user identity of a user, transmitting the correlation identity as part of a registration procedure to the application server, and the application server initiates, based on a received session request associated with the user, at least one session request towards corresponding number of devices of the user wherein the application server is configured to check the correlation identity to ensure that not more than one session request is initiated for each device of the user.

12 Claims, 10 Drawing Sheets

(56) References Cited

U.S. PATENT DOCUMENTS

| | | | |
|---|---|---|---|
| 2004/0196796 A1 | 10/2004 | Bajko et al. | |
| 2004/0230697 A1 | 11/2004 | Kiss et al. | |
| 2004/0249910 A1* | 12/2004 | Jerbi et al. | 709/222 |
| 2006/0013195 A1* | 1/2006 | Son et al. | 370/352 |
| 2006/0053227 A1* | 3/2006 | Ye et al. | 709/230 |
| 2006/0229934 A1* | 10/2006 | Law | 705/10 |
| 2008/0205413 A1* | 8/2008 | Purnadi et al. | 370/401 |
| 2008/0261686 A1* | 10/2008 | Bedingfield | 463/29 |
| 2010/0189072 A1* | 7/2010 | Vikberg et al. | 370/331 |
| 2011/0032906 A1 | 2/2011 | Mutikainen et al. | |

OTHER PUBLICATIONS

3GPP et al "Consideration of the relationship between Domain Selection and Personal Network Management" 3GPP TSG SA WG2 Architecture.*

3GPP TSG SA WG2 Architecture "Consideration of the relationship between Domain Selection and Personal Network Management" Personal Network Management (PNM)/ Release 7—Jan. 15-19, 2007.*

3GPP TSG SA WG2 Architecture, "Ericsson: Consideration of the relationship between Domain Selection and Personal Network Management", Jan. 15-19, 2007.

International Search Report dated Mar. 22, 2010 for PCT application No. PCT/EP2008/008570.

3rd Generation Partnership Project; Technical Specification Group Services and System Aspects; IP Multimedia Subsystem (IMS); Stage 2 (Release 8). 3GPP TS 23.228. V8.6.0. Sophia Antipolis Valbonne, France. Sep. 2008.

3rd Generation Partnership Project; Technical Specification Group Services and System Aspects; Voice Call Continuity (VCC) between Circuit Switched (CS) and IP Multimedia Subsystem (IMS); Stage 2 (Release 7). 3GPP TS 23.206. V7.5.0. Sophia Antipolis Valbonne, France. Dec. 2007.

3rd Generation Partnership Project; Technical Specification Group Services and System Aspects; Single Radio Voice Call Continuity (SRVCC); Stage 2 (Release 8). 3GPP TS 23.216. V8.1.0. Sophia Antipolis Valbonne, France. Sep. 2008.

3rd Generation Partnership Project; Technical Specification Group Core Network and Terminals; Voice Call Continuity between the Circuit-Switched (CS) domain and the IP Multimedia Core Network (CN) (IMS) subsystem; Stage 3 (Release 7). 3GPP TS 24.206. V7.5.0. Sophia Antipolis Valbonne, France. Jun. 2008.

3rd Generation Partnership Project; Technical Specification Group Core Network and Terminals; Combining Circuit Switched (CS) and IP Multimedia Subsystem (IMS) services; Stage 3 (Release 8). 3GPP TS 24.279. V8.0.0. Sophia Antipolis Valbonne, France. Dec. 2007.

3rd Generation Partnership Project; Technical Specification Group Services and System Aspects; IP Multimedia Subsystem (IMS) Centralized Services; Stage 2 (Release 8). 3GPP TS 23.292. V8.0.0. Sophia Antipolis Valbonne, France. Jun. 2008.

3rd Generation Partnership Project; Technical Specification Group Core Network and Terminals; IP Multimedia (IM) Core Network (CN) subsystem Centralized Services (ICS); Stage 3 (Release 8). 3GPP TS 24.292. V1.0.0. Sophia Antipolis Valbonne, France. Sep. 2008.

* cited by examiner

CORRELATING COMMUNICATION SESSIONS

RELATED APPLICATION

This application was originally filed as PCT Application No. PCT/EP2008/008570 filed Oct. 10, 2008.

TECHNICAL FIELD OF THE INVENTION

The invention relates to a session handling entity, application server, a method and computer program products for correlating communication sessions.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Forking is ability of a SIP proxy to send SIP requests to multiple destinations at the same time.

The standardized IMS includes number of features that have relationships with each other. One of features is capability to share the same user identity in multiple devices as shown in this FIG. 1. For example, a user can have two or more devices that share the same identity for example the same IMS public user identity (IMPU), like public user identity 2 in FIG. 1. The shared identity can be used to initiate communication with any of these devices. Similarly a user can receive communication targeted to this identity with any of the devices bound to this identity. Identity concept could be extended also to cover use case where two or more different users, for example two family members, are sharing the same identity.

Voice call continuity (VCC) as defined by the 3GPP defines a capability to offer mobile voice services for a multi-radio terminal user via both circuit switched (CS) and packet switched (PS)/IMS access as preferred. The feature also contains capability to transfer ongoing call from one access to another e.g. from wireless local are network (WLAN) to CS access.

Single Radio VCC (SR-VCC) enables to perform handover from long term evolution (LTE) radio access network to CS access network. A network function is acting as a gateway between UE and an application server (AS) providing voice call continuity feature. The network function which can also be called as interworking function (IWF) can initiate a handover request towards the application server (AS) providing the voice call continuity based on received information from a radio access network, such as LTE, and from an evolved packet core system.

Multimedia session continuity enables continuity of PS media streams when PS access is changed, for example, by transferring a video session from WLAN to Universal Mobile Telecommunications System (UMTS) terrestrial radio access network (UTRAN) using IMS and application layer mechanisms. IMS centralized services (ICS) provide service execution in the IMS even though a device can use CS network to make calls. All services are executed in the IMS and all originated and terminated CS calls are forcedly routed to the IMS for service execution. To manage mid-call services ICS UE must use SIP signalling to initiate service execution. This control channel is called as I1-PS in ongoing standardization.

It is possible an IMS user to register its Public User Identity from several devices. In addition, the user may have multiple CS capable devices under his IMS Public User Identity. In this case parallel ringing can take place. Currently there exist challenges in call termination if the user has the same device reachable via both CS and PS access at the same time and forking is used to implement parallel ringing.

SUMMARY OF THE INVENTION

The present invention overcomes the above problem by providing a session handling entity and method comprising:
  receiving a request for registering a user,
  obtaining a correlation identity associated with a private identity of the user from a register entity, for transmitting the correlation identity to an application server as part of a registration procedure. The registration procedure can be a $3^{rd}$ party registration of a session initiation protocol.

It is also provided a session handling entity and a method comprising:
maintaining contact addresses of devices, the contact addresses being associated with correlation identities, receiving a request to setup a communication session to a user, the request comprising a correlation identity associated with a private identity of the user, selecting a contact address for setting up the communication session wherein the selecting comprises selecting based on the correlation identity. Further transmitting a request to setup the communication session towards the user with the selected contact address and/or removing the correlation identity from the request before transmitting towards the user can take place.

An application server and method is provided, comprising receiving a request for setting up a communication session with a user, determining, based on registrations of the user and correlation identities associated with the registrations, the number of devices the user has registered, and access technologies via which each device is registered, initiating communication with plurality of registered devices of the user, wherein the initiating comprises checking the result of the determining and thereby initiating the communication so as to initiate communication with each device of the user not more than one time.

The initiating the communication can comprise implementing functions of forking or parallel ringing to reach the user via multiple destinations and/or the determining can comprise determining based on the correlation identity that at least one device of the user has been registered via both circuit switched and packet switched access technologies and the initiating communication comprises setting up the communication to the at least one device of the user via one of the circuit switched and the packet switched access technologies.

Further transmitting at least one request including the correlation identity to setup the communication with the user can take place. The request can be transmitted to a session handling entity.

It is provided an application server and method comprising:
receiving at least one request for setting up a plurality of media streams with a user,
determining, based on registrations of the user and correlation identities associated with the registrations, access technologies via which each device of the user is registered,
splitting the plurality of media components to be delivered to the user via at least two different access technologies, and initiating communication of the plurality of media streams to a device of the user by including the correlation identity relating to the device so as to prevent forking of the media stream to at least one other registered device of the user.

The receiving the at least one request can comprise receiving a single request for plurality of media streams, or receiving at least two requests relating to a session, wherein the latter requests comprises a request to add a new media stream to the ongoing session.

A method is provided for correlating sessions in a communication system, comprising:
obtaining, from a register entity, a correlation identity for a registering private user identity of a user, transmitting the correlation identity as part of a registration procedure to an application server,
initiating, by the application server, based on a received session request associated with the user, at least one session request towards corresponding number of devices of the user wherein the application server is configured to check the correlation identity to ensure that not more than one session request is initiated for each device of the user.

A method is provided for correlating sessions in a communication system, comprising:
obtaining, from a register entity, a correlation identity for a registering private user identity of a user, transmitting the correlation identity as part of a registration procedure to an application server,
splitting plurality of media streams of a session to be delivered to a device of the user via different access technologies, and
initiating, by the application server, delivery of the media streams to the device, by checking the correlation identity associated with the user to prevent forking of at least one of the media streams to another device of the user.

A computer program product is provided for implementing the methods above comprising code means adapted to produce the method when loaded into the memory of a computer.

Embodiments of the present invention can have one or more of the following advantages:
When the same end user device is reachable via more than one access networks at the same time, the network tries to reach the device only once, over one of the access networks.
Implementation is in the network side, without impact to end user devices. Hence, the solution works with combination of 3GPP devices of different releases.

DETAILED DESCRIPTION OF THE INVENTION

Figure 1:
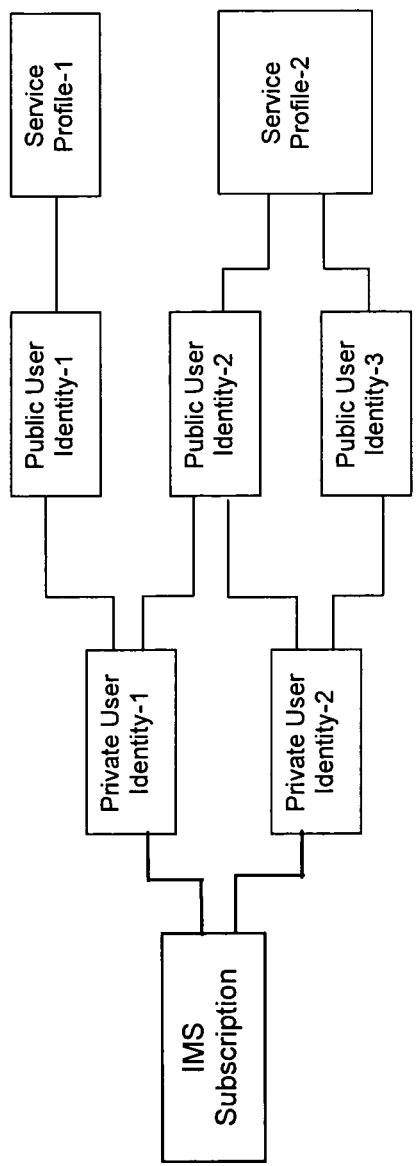
FIG. 1 illustrates shared IMS identities

Different type of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS is responsible for holding the following user related information:
User Identification, Numbering and addressing information
User Security information: Network access control information for authentication and authorization, such as password information
User Location information at inter-system level: the HSS supports the user registration, and stores inter-system location information, etc.
User profile information.

Cx reference point or Cx interface is an interface between a CSCF and a HSS, supporting the transfer of data between them. The Cx reference point is based on the diameter protocol with 3GPP standard diameter applications. Sh interface is a corresponding interface between the HSS and an AS. Diameter is an authentication, authorisation, and accounting (AAA) protocol defined by the IETF and used for network access services, such as dial-up and mobile IP.

An Application Server (AS) is offering value added IP multimedia (IM) services to users of the IMS network and resides either in the IMS user's home network or in a third party location. The third party could be a network or simply a stand-alone AS. The AS may host and execute various services and can influence and impact a SIP session on behalf of the services. The IP multimedia Subsystem Service Control Interface (ISC) interface is between the S-CSCF and the service platforms (i.e. Ass). The ISC interface offers extended services to subscribers. ASs that are connected to the IMS are controlled via ISC interface. The protocol used on the ISC interface is the SIP.

A media gateway control function (MGCF) acts as an interworking point between a circuit switched (CS) network and an IP network in the control plane of the network. The MGCF controls the parts of the call state related to connection control for media channels in a media gateway (MGW), communicates with call state control, and performs protocol conversion between the call control protocols, such as SIP and ISUP.

IP Multimedia (IM) private user identity (IMPI) is a user identity that is assigned by the home network operator and used, for example, for registration, authorisation, administration, and accounting purposes. The private user identity is stored in the IM services identity module (ISIM). For the UMTS subscriber identity module (USIM), the private user identity is derived from the international mobile subscriber identity (IMSI). The private user identity takes the form of a network access identifier (NAI). The private user identity identifies the user for the IMS and it is stored in the Home Subscriber Server (HSS)

IM public user identity (IMPU) is a user identity that is used by any user for requesting communications with other users. The public user identity takes the form of a SIP uniform resource identifier (URI) or E.164 number in form of TEL URI. Every IMS subscriber has one or more public user identities. At least one public user identity is stored in the IM services identity module (ISIM). The user equipment can receive more public identities from the IMS, where they are stored in the HSS. For a user with a UMTS subscriber identity module (USIM), a temporary public user identity is derived from the international mobile subscriber identity (IMSI). In some cases, the value will be the same as that of the private user identity.

Contact and contact address refer to Contact header of SIP. Contact provides a SIP URI that can be used to contact that specific instance of the UE for subsequent requests. The scope of the Contact can be global. That is, the Contact header field value contains a URI at which the UE would like to receive requests, and this URI is valid even if used in subsequent requests outside of any dialogs. A Contact header field value can contain a display name, a URI with URI parameters, and header parameters.

TEL URI is a uniform resource identifier (URI) address which identifies a connection to a terminal that handles normal voice telephone calls, a voice mailbox or other voice messaging system.

The IMS contains means to indicate and distribute so called default IMS public user identifier. From UE point of view, a SIP 200 OK of REGISTER request can contain the default public user identity as the first uniform resource identifier (URI) on the list of URIs present in P-Associated-URI header of SIP protocol. A P-CSCF behavior can store the default public user identity, including its associated display name, if provided, for use with procedures for the P-Asserted-Identity header. The default public user identity can be the first on the list of URIs present in the P-Associated-URI header. The first URI on the list of public user identities supplied by a HSS to a S-CSCF can indicate the default public user identity to be used by the S-CSCF. The S-CSCF is requested to include this in the P-Associated-URI header when sending 200 OK of REGISTER request. When a session is established a P-CSCF can set a network asserted identity in a P-Asserted-Identity header of SIP to outgoing request based on the preference indicated by the UE (P-Preferred-Identity) or based on the default IMS public user identifier in case the UE did indicate the preferred identity.

It is possible an IMS user to register its Public User Identity from several devices. In addition, the user may have multiple CS capable devices under his IMS Public User Identity. In these cases parallel ringing can take place; an incoming session should fork to all of these devices based on the registered capabilities.

However, in case when the user has multiple registered devices, some of the devices may be reachable via PS only, some via PS and CS, and some via CS only. So-called terminating access domain selection function (T-ADS) should select appropriate contacts so that each device is contacted once, but no more than once. In other words, the T-ADS should not fork the request to the same device via both CS and PS accesses.

This means the T-ADS should be aware that certain contact address and CS Routing Number (CSRN) would reach the same device.

Figure 2:
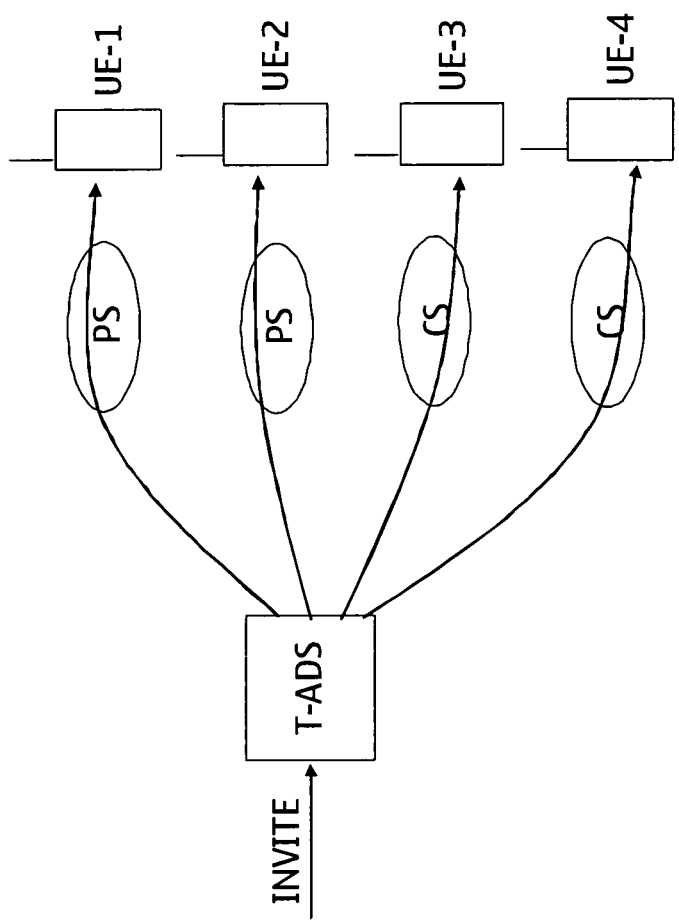
FIGS. 2-4 presents IMS scenarios relevant for the invention.
Figure 3:
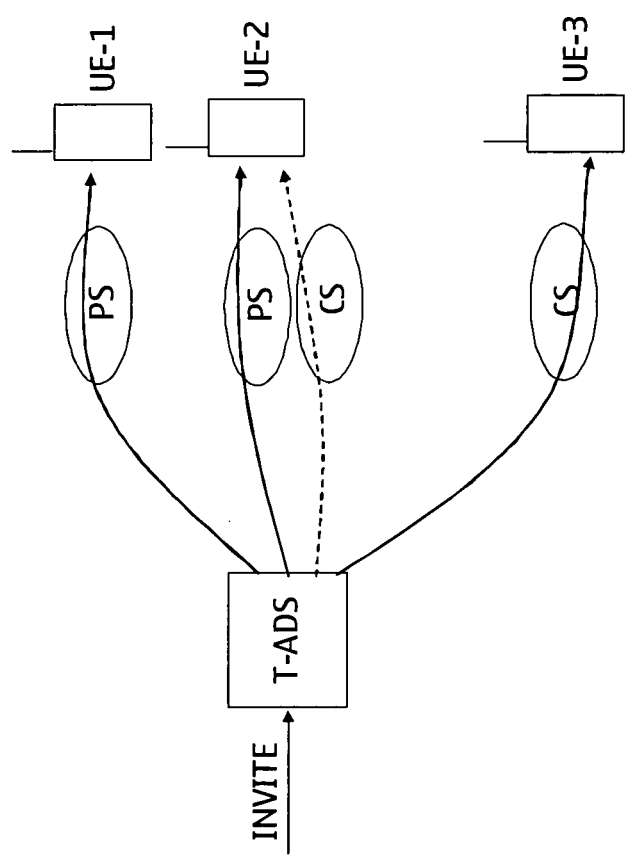
Figure 4:
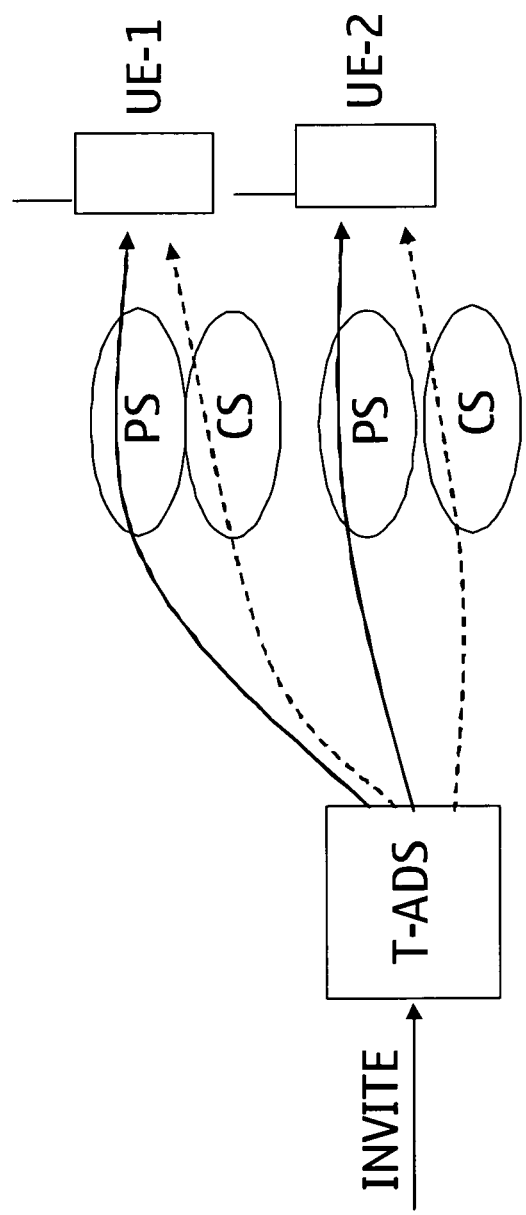

The problem is illustrated in the FIGS. 2-4. In FIG. 2 there exist four devices, two reachable via CS, two via PS. In FIG. 3 there is three devices, one reachable via PS, one via CS, one via CS and PS. In FIG. 4 there exist only two devices which both are reachable via CS and PS. However, in all three scenarios, the current T-ADS is only aware that the user has two registered contacts in the IMS, and two CSRNs. But the current T-ADS is not able to correlate the CSRNs to the IMS contacts.

Basic use of correlation identity in the IMS to correlate session legs has been discussed for example in earlier patent application PCT/EP2008/054239 filed on 8 Apr. 2008.

An operator may define a correlation identity, for example a correlation (tel) URI, for users as part of their subscription data. This information can be permanently stored in the HSS and can be downloaded to an S-CSCF when a user registers to the IMS. As part of originating service control procedures, the S-CSCF can use the downloaded information to execute proper service control. When the correlation identity is assigned for the users, the S-CSCF may add this identity to the request which is sent for application server(s) providing additional service execution. The HSS can transmit a correlation identity also to an application server AS, for example over Sh interface.

A user may have multiple public user identities and even multiple implicit registration sets. In order to ensure correct behaviour in all possible cases, the operator can ensure that correlation identity is present in all required implicit registration sets that contains public user identity (identities) that are subject for session correlation at the application server(s). This can be realized so that a correlation identity is assigned to all implicit registration sets. If the correlation identity is not intended for communication in all implicit sets it can be marked as barred public user identity in those sets that do not use correlation identity for ordinary communication but it is used only for correlation purposes.

According to an embodiment of the invention, S-CSCF functionality can be enhanced to deliver a unique correlation identity (Correlation-id) per IMS Private User Identity to an AS during the IMS registration. At the time of registration, the S-CSCF can obtain the Correlation-id from the HSS. Correlation-id can be bound to the IMS private identity. The AS functionality can be enhanced to utilize the Correlation-id in handling of terminating initial requests to ensure that each device will receive communication attempt only once. The AS can be able to determine the number of devices the user has, and the domain(s) via which each device is reachable. The AS can communicate the Correlation-id to the S-CSCF along the initial terminating request.

The S-CSCF can be enhanced to filter the registered IMS contacts based on the correlation identity received from the AS when selecting the target contacts for an initial request. By this the S-CSCF can prevent unwanted forking. The S-CSCF can remove the correlation identity before sending the request to a P-CSCF.

In one example, T-ADS functionality can be extended to be aware of the correlation between the certain CSRN and the corresponding IMS registered contact. By this correlation information, the T-ADS can select each device once, and only once, when forking an incoming request. When UE registers to the IMS, an S-CSCF of the IMS can notify the T-ADS regarding the Correlation-id of the registering IMS private identity. When the T-ADS selects the target contacts, it can determine the Correlation-id for each attached device from the CSRN, which can be derived from an MSISDN, and from the IMS private identity. If the Correlation-ids match, the T-ADS can determine that both target contacts, the CSRN and the IP contact addresses under the IMS private identity, would reach the same device. The S-CSCF can filter the target contacts based on the Correlation-id in the terminating request, for example, the S-CSCF can select only the contacts under the corresponding IMS private identity.

In SR-VCC example, the S-CSCF can fill the Correlation-id into requests towards the Service Centralization and Continuity Application Server (SCC-AS) When an interworking function (IWF), such an MSC performs the SR-VCC, the S-CSCF can execute the iFC and can add the same Correlation-id to the domain transfer request towards the SCC AS. In this way, the SCC AS can be able to correlate the CS and IMS call legs by comparing the Correlation-id values. The SCC AS can implement functions of an T-ADS.

Figure 5:
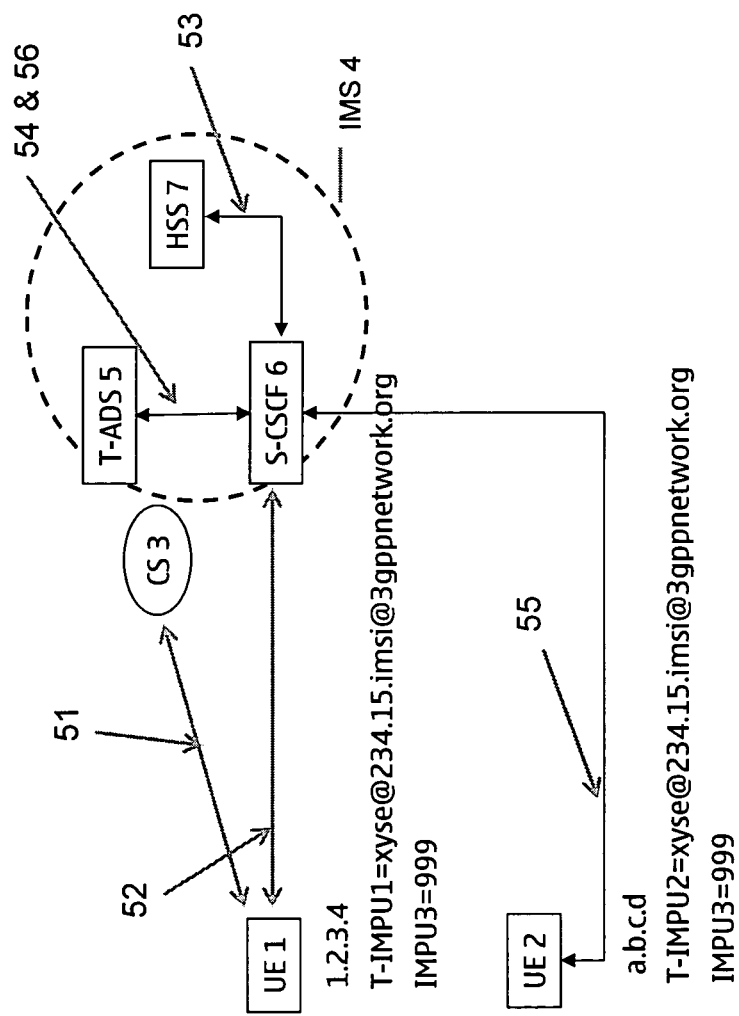
FIG. 5 presents an embodiment of the invention where UEs are registering to the network.

FIG. 5 illustrates an example of the invention. A user can have two devices, UE 1 and UE 2. The UE 1 can be a dual mode device supporting both CS 3 and IMS 4. The UE 1 can use CS 3 domain for voice communication. UE 2 can be full blown IMS 4 VoIP capable end-point, for example, a laptop. The end-points (UE 1 and UE 2) can share a common end-user identity and can be able to initiate calls and receive incoming calls. The identity can be a Tel-URI type of IMS public user identity, in this example '999' (IMPU3) due to simplicity. In the CS 3 domain a unique MSISDN can be allocated per subscriber identity module (SIM) card. Here '111' has been allocated to the UE 1.

In step 51, the UE 1 attach to the CS 3 core. After the successful attach the user is able to receive incoming calls and make calls via CS 3 domain. The IMS application server, T-ADS 5, providing services for the user can be informed by CS 3 status for example using customised applications for mobile network enhanced logic (CAMEL) protocol (not shown in fig). In step 52, the same device UE 1 registers to the IMS 4. The shared identity is registered and during the registration the S-CSCF 5 can download a user profile from the HSS 7 is step 53. The user profile data can contain the correlation identity which can be bound to IMPI used in the registration. Here correlation identity#1 (111) is bound to IMPI1 and is delivered to the S-CSCF 6.

When the S-CSCF 6 has obtained the correlation information, the S-CSCF 6 can transmit, in step 54, it to the AS 5. The AS 5 is then aware of the Correlation identity-IP contact address(es) binding. The S-CSCF 6 may use for example reg-event package extension (specified in IETF RFC 3680) or 3rd party registration to inform the AS 5.

Next, UE 2 is turned on and it registers the same user to the network. In step 55, the UE 2 registers its contact address via IP connectivity access network (not shown) and its IMPUs. The IMS 4 registration happens similarly than for the UE 1 above. The S-CSCF 6 delivers the second correlation identity ('222') to the AS 5 in step 56. After the successful registration the user is reachable via two devices, UE 1 and UE 2, that share the same end user identity (here '999').

When another user is trying to reach the user of the UE 1 and UE 2, the AS 5 has necessary information to execute terminating domain selection in such manner that all devices (UE 1, UE 2) of the user will ring and none of them is getting a communication request twice via different bearers (IMS 4 and CS 3).

To summarize, the information at the T-ADS 5 in FIG. 5 (only relevant information listed):
 CS-registered: 111→used to obtain CSRN later on
 IMS-Reg: 999=1.2.3.4=Correlation Id 1 (111)
 IMS-Reg: 999=a.b.c.d=Correlation Id 2 (222)
'1.2.3.4' and 'a.b.c.d' represent contact addresses (IP addresses) which can be used to reach a particular device.

Figure 6:
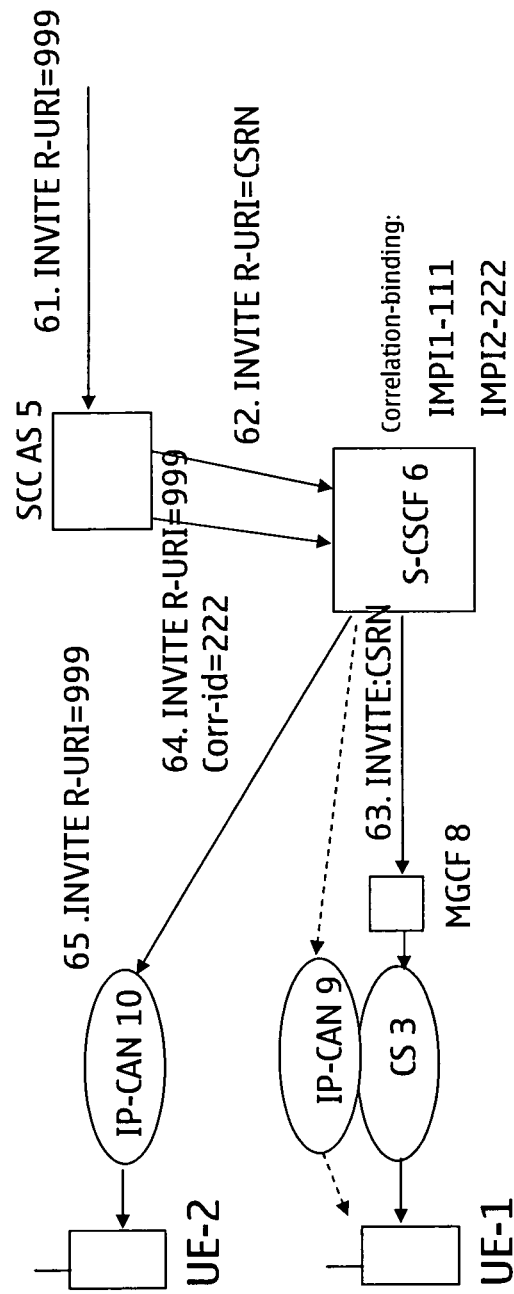
FIG. 6 presents an embodiment of the invention where a request is terminated to registered UEs.

FIG. 6 explains how an embodiment of the invention can be used in terminating communication sessions. In step 61, an incoming communication request (e.g. SIP INVITE) is routed to the AS 5 using the shared identity (here '999'). By using the correlation identities, the AS 5 can determine that the user has two registered devices (UE 1, UE 2), and the first device (UE 1) is reachable via CS 3 and PS (IMS 4), and the second one (UE 2) is reachable via PS (IMS 4).

The AS 5 can make a decision to reach the UE 1 via the CS 3 domain, therefore it can use the unique MSISDN to resolve CSRN of UE 1, and can then generate a SIP INVITE request which is targeted to the CS 3 core entity taking care of termination via the CS 3 in step 62. The S-CSCF 6 can route the INVITE with CSRN in R-URI to the CS 3 core is step 63, for example via an MGCF 8. Finally the UE 1 receives the INVITE request and can start alerting the user.

The AS 5 can decide to reach the UE 2 via the IMS 4 and can obtain the correlation identity for the UE 2. In step 64, the AS 5 can send SIP INVITE request to the S-CSCF 6. The request can contain the shared identity as the target and in addition the correlation identity of the UE 2. Based on the received correlation identity the S-CSCF 6 is able to derive the contact address to be used.

The S-CSCF 6 can execute a target contact selection. In addition, the S-CSCF 6 can filter the contacts based on the received correlation identity, so that only the contacts under this correlation identity are selected. In this example, only the contact for UE 2 is selected. However, if the UE 2 is registered via multiple contact addresses the S-CSCF 6 may use any of them according to SIP outbound mechanisms. When the correct contact address for the device is selected the S-CSCF 6 can send, step 65, the request towards the UE 2. The UE 2 receives the INVITE request, over IP-CAN 10, and can start alerting the user.

In an aspect of the invention, the S-CSCF 6 can remove the correlation identity before sending the request out towards UEs/P-CSCF.

By implementing embodiments of the invention, a duplicate connection setup to the UE 1 via the IP-CAN 9 can be prevented (FIG. 6).

In an aspect of the invention an application server, such as SCC AS, can decide to split non-speech media and speech media for a certain UE. The AS may need to split the terminating session into different media streams, and deliver the media streams to the particular device via different accesses, for example, non speech media streams via IP-CAN and speech via CS domain. The media splitting may occur also when a new media stream is added to an existing session by a remote party. In both cases, the terminating session handling must ensure that the second session is delivered only to the same device with the first media stream. In other words, the AS must be able to prevent forking of the second session. For example, if the AS has delivered the speech session to the device by using the CSRN, the AS must be able to correlate the CSRN with the IMS contact address of the same device at the time when the splitting occurs. The AS can use a correlation identity to ensure the split sessions are delivered only to this particular UE, and not forked to other UEs of the user.

Figure 8:
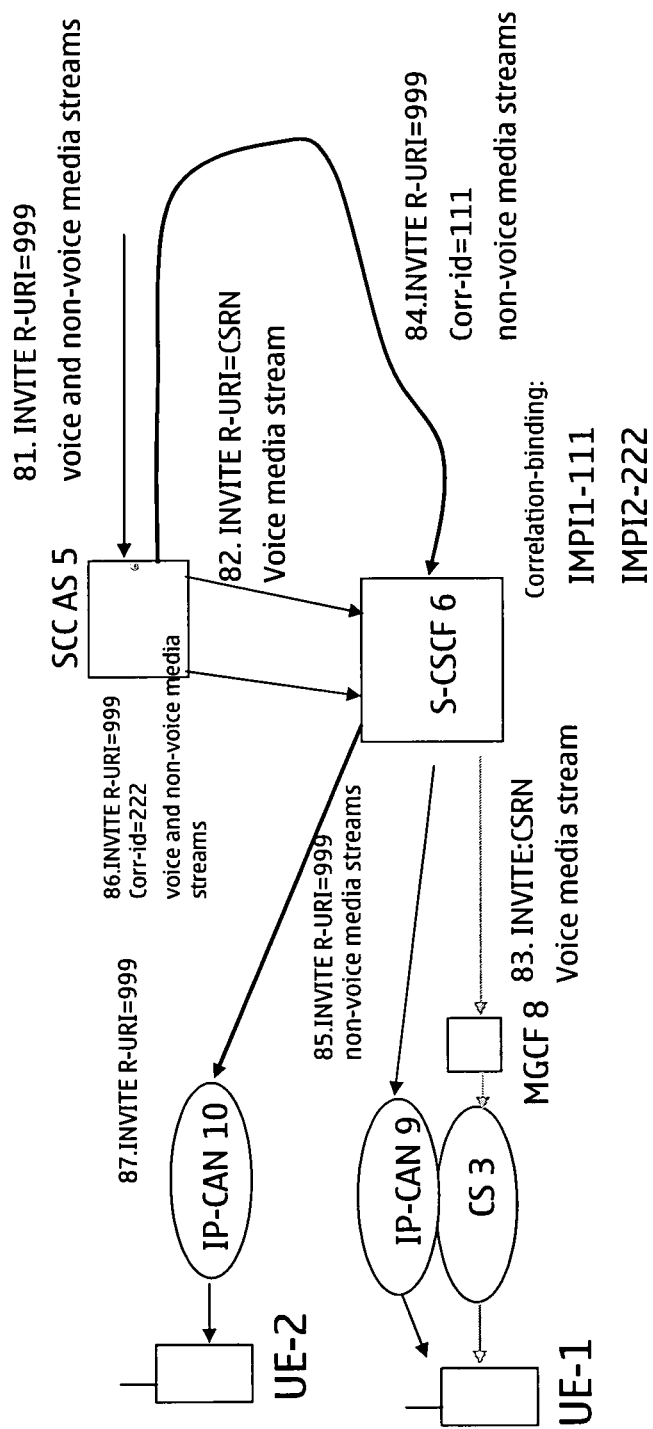
FIGS. 8 and 9 illustrate an embodiments of the invention in which media components relating to a session are split.

FIG. 8 illustrates an aspect of the invention relating to a media splitting. In step 81, a new request is received to establish a communication session including both voice and non-voice, such as video, components. In step 82, the voice stream is established over CS to UE-1 by the application server 5, by indicating CSRN of the UE-1 to an S-CSCF 6. The S-CSCF 6 can store the IMPI-correlation identity mapping, in this example:

IMPI1-111
IMPI2-222

In step 83, the session is established over CS to the UE-1. In step 84, the AS 5 request to establish the non-voice media steam to the UE-1 by including the correlation identity (here '111') relating to the UE-1 (IMPI 1). In step 85, the S-CSCF 6 establishes the non-voice session over IP-CAN 9 to the UE-1. In step 86, the AS 5 establishes delivery of both media stream to UE-2 by indicating the correlation identity (here '222') relating to the UE-2 (IMPI2). Based on the correlation identity the S-CSCF 6 can determine that the target device for all media is the UE-2. Therefore, the S-CSCF 6 should not fork the non-voice media to the UE-1 although the UE-1 is sharing the same identity (here R-URI '999' for both). The correlation identity associated with the UE-1 is different from the correlation identity in the request in step 86. In step 87, the S-CSCF 6 can deliver both voice and non-voice media to the UE-2 over IP-CAN 10.

Figure 9:
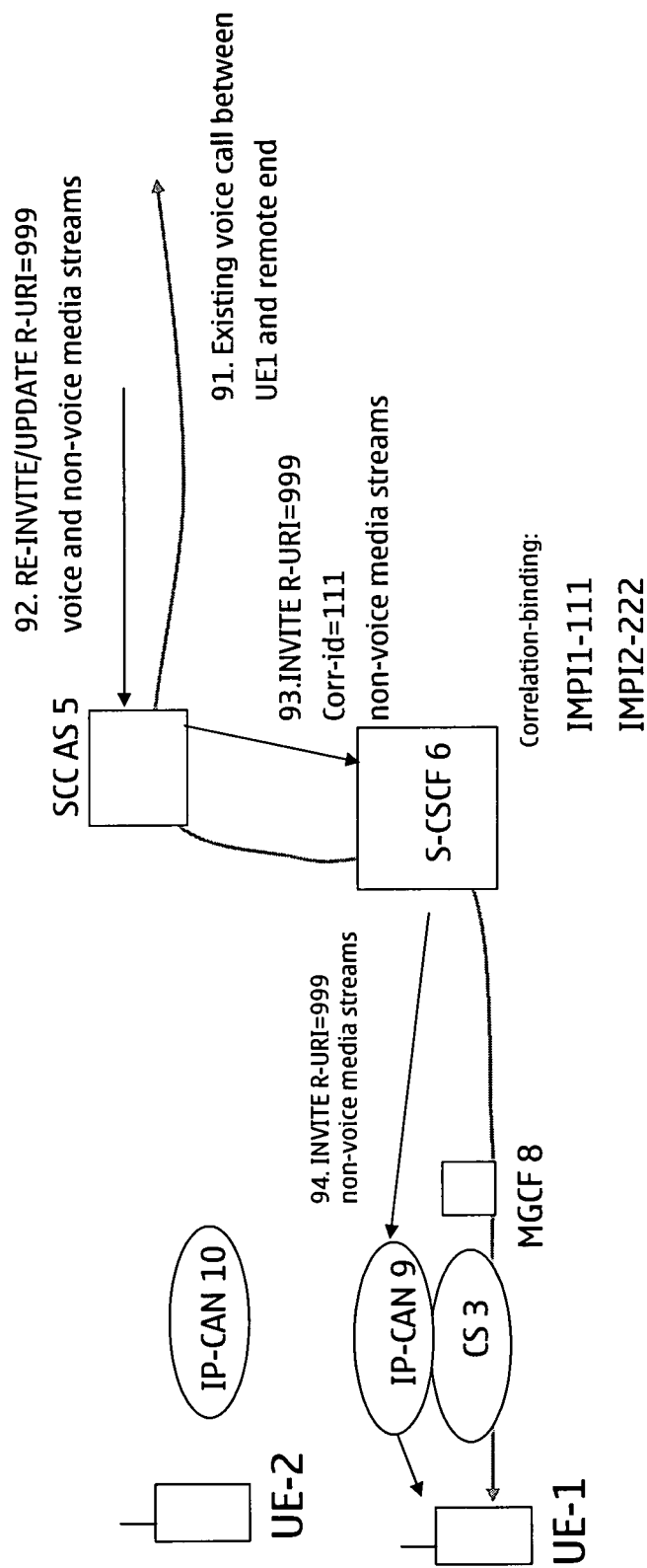

FIG. 9 shows a similar example in which a media split is performed during an ongoing session. In step 91 an voice session is established. In step 92, a new request relating to the session is received. The request is adding a non-voice component to the session. In step 93, the AS 5 initiates with a request a new session for delivering the added non-voice component to the UE-1. The AS 5 can include in the request a correlation identity associated with the UE-1 (IMPI 1), thereby the S-CSCG 6 can detect that the target device for the new media stream is the UE-1, and the request should not be forked to the UE-2.

Figure 7:
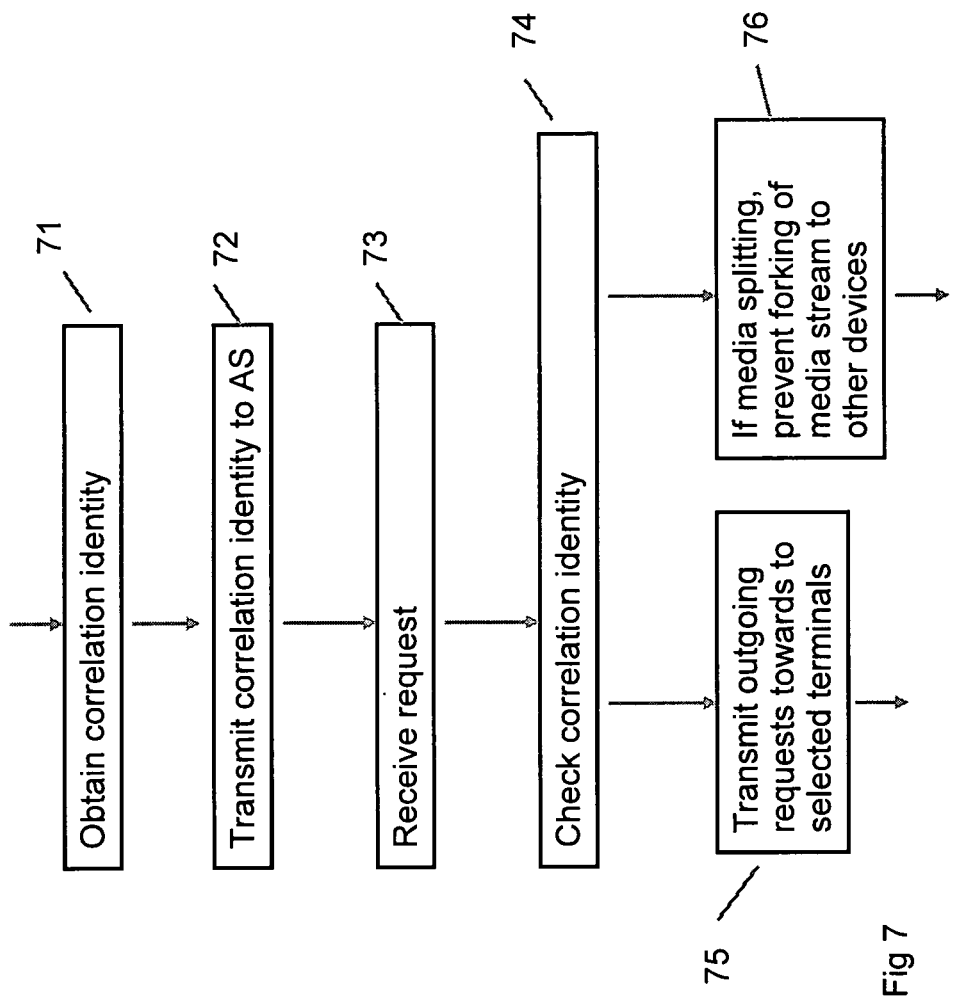
FIG. 7 illustrates process steps of an embodiment of the invention.

FIG. 7 describes process steps for implementing aspects of the invention. In step 71, a correlation identity for a private user identity of a registering user is obtained, for example from a register entity such as HSS. In step 72, the correlation identity is transmitted as to an application server part of a registration procedure, for example using $3^{rd}$ party registration mechanism. In step 73 a new session request is received to reach the user. In step 74, the correlation identity is checked to ensure that not more than one session request is initiated for each device of the user. As part of the check it can be determined the number of devices the user has, and one or more domains via which the each device is reachable (CS 3, IMS 4). Since also other criteria can be considered, such as device capabilities, it is possible that no session request at all is initiated to some device(s). In step 75, the application server (AS) initiates based on a received session request and the check performed in step 74, the correct amount of outgoing session requests towards the relevant devices of the user. Alternatively, or in addition, if the AS performs media splitting and deliver different media via different accesses to the UE, in step 76, the AS can ensure based on the check performed in step 74 that the media streams are delivered to the same device, an that no forking take place.

The examples described above scale and can be applicable to other similar use cases specified in 3GPP service continuity and consistence work.

Figure 10:
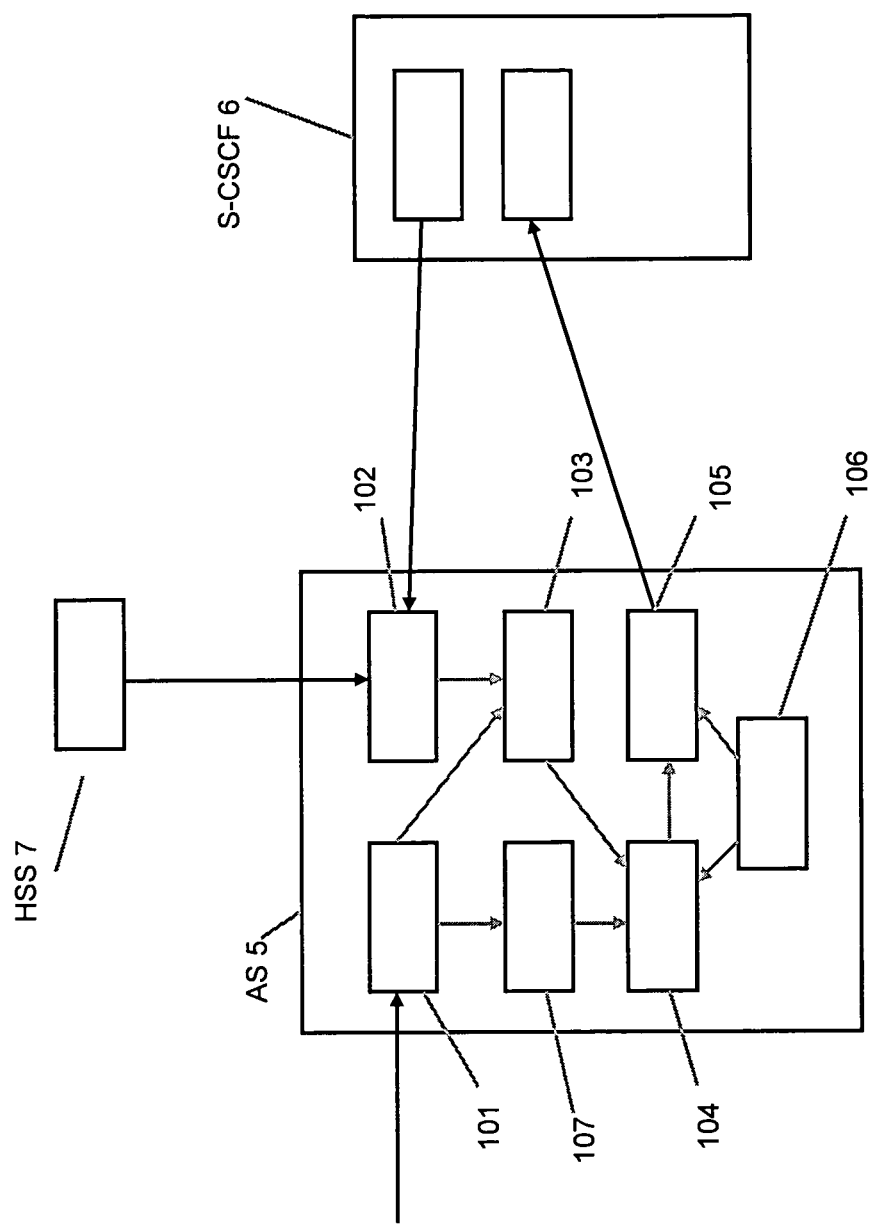
FIG. 10 presents internal structure and functions of network element implementing aspects of the invention.

FIG. 10 shows internal structure of an application server 5 implementing aspects of the invention. The AS 6 has a receiving unit 101 configured to receive requests, such as SIP request, for setting up communication with a user. The request can be, for example, a request for establishing a new SIP session, or a request to add a new media component or media stream to an existing session. The maintaining unit 102 can be configured to maintain information on registrations of users of the communication system, for example, identities of users, correlation identities which can be associated with the registrations, access technologies via which each device is registered and so on. The maintaining unit 102 can receive registration related information for example from a session handling entity, such as an S-CSCF, or from a register entity, such as an HSS. The determining unit 103 can be configured to determine the number of devices the user has registered and access technologies via which each device is registered based on the information available in the maintaining unit 102. The initiating unit 104 can be configured to initiate communication with plurality of registered devices of the user based on the determination performed by the determining unit 103. The communication can be initiated so that each device of the user is not tried to reach more than one time, for example, even if a device is registered via both CS and PS access technologies, a session request is sent only once, over either CS or PS access, but not twice. For example SIP requests can be used to initiate the communication. A transmitting unit 105 can be configured to transmit the signaling for initiating the communication, for example, by transmitting a SIP request with the determined correlation identity to reach the device via correct access technology, to, for example, a session handling entity, such as S-CSCF.

The application server 5 can have a call control unit 106 that can be configured to implement functions of forking or parallel ringing features to reach a user via parallel multiple destinations. A media splitting unit 107 can be configured to split the media relating to a session so that different media components, such as voice and video, can be delivered to a single device via different access technologies. For example, voice component can be transferred over CS access, and video component over PS access. The media splitting unit 107 can decide to split a session when a new session is established or when a new media component is added to an ongoing session. The media splitting unit 107 can use the information of the maintaining unit 102 and/or the determination results of the determining unit 103 to ensure that, when splitting two or more media components to be delivered via different accesses, no request is forked to deliver media to wrong devices. This can be performed by analyzing the information stored in the maintaining unit 102 for finding the correct device and access technology, and by indicating the corresponding correlation identity in a request to establish media stream towards the device.

All units described above may be implemented for example using microprocessors and/or other electrical components and/or by software.

A session handling entity and an application server entity may be physically implemented in a switch, router, server or other hardware platform or electronic equipment which can support data transmission and processing tasks, or can be implemented as a component of other existing device.

According to aspects of the invention, application server functionality is extended to be aware of the correlation between a certain CSRN and IMS registered contact. By this correlation information, the AS is able to select each device once, and only once, when forking the incoming request. In addition, the AS is able to select only a particular device and prevent forking in case of media splitting between CS domain and IP-CAN.

The invention is not limited to the IMS, but can also be applied in other type of networks having similar type of shared identities as in the IMS. Therefore, the IMS, the S-CSCF, and the AS are only used here as examples communication system and network elements. Functions of the session handling entity and the application server entity described above may be implemented by code means, as software, and loaded into memory of a computer.

The invention claimed is:

1. An apparatus comprising at least one processor and at least one memory including computer program code, the at least one memory and the computer program code configured to, with the at least one processor, cause the apparatus at least to:
   receive a request for setting up a communication session with a user;
   determine, based on one or more registrations and one or more correlation identities for a first one or more devices registered to the user, a total number of the first one or more devices registered to the user and one or more access technologies via which the first one or more devices is registered;
   initiate communication with the first one or more devices such that the communication is initiated with each device not more than one time by at least
      matching the one or more correlation identities associated with the first one or more devices to at least one matching correlation identity, the at least one matching correlation identity associated with different access technologies in a particular device of the first one or more devices, wherein the different access technologies comprise packet switched and circuit switched access technologies, and
      initiating communication via only one of the different access technologies associated with the particular device having the at least one matching correlation identity; and
   determine, based on the one or more correlation identities, that a second one or more devices registered to the user is registered via both circuit switched and packet switched access technologies; and
   set up the communication to the second one or more devices via one of the circuit switched and the packet switched access technologies.

2. The apparatus of claim 1, wherein the apparatus is further caused to:
   implement one of the functions of forking and parallel ringing to reach the user via the first one or more devices registered to the user.

3. The apparatus of claim 1, wherein the apparatus is further caused to:
   transmit one or more requests including a correlation identity to set up the communication with the user.

4. The apparatus of claim 3, wherein the apparatus is further caused to:
   transmit the one or more requests to a session handling entity.

5. A method comprising:
   receiving a request for setting up a communication session with a user;
   determining, based on one or more registrations and one or more correlation identities for a first one or more devices registered to the user, a total number of devices registered to the user and one or more access technologies via which the first one or more devices is registered;
   initiating communication with the first one or more devices such that the communication is initiated with each device not more than one time by at least
      matching the one or more correlation identities associated with the first one or more devices to at least one matching correlation identity, the at least one matching correlation identity associated with different access technologies in a particular device of the first one or more devices, wherein the different access technologies comprise packet switched and circuit switched access technologies, and
      initiating communication via only one of the different access technologies associated with the particular device having the at least one matching correlation identity; and
   determining, based on the one or more correlation identities, that a second one or more devices registered to the user is registered via both circuit switched and packet switched access technologies; and
   setting up the communication to the second one or more devices via one of the circuit switched and the packet switched access technologies.

6. The method of claim 5 further comprising:
   implementing one of the functions of forking and parallel ringing to reach the user via the first one or more devices registered to the user.

7. The method of claim 5 further comprising:
   transmitting one or more requests including a correlation identity to set up the communication with the user.

8. The method of claim 7 further comprising:
   transmitting the one or more requests to a session handling entity.

9. A computer program product comprising a non-transitory computer-readable medium encoded with instructions that, when executed by one or more processors, cause an apparatus to at least perform the following operations:
   receiving a request for setting up a communication session with a user;
   determining, based on one or more registrations and one or more correlation identities for a first one or more devices registered to the user, a total number of devices registered to the user and one or more access technologies via which the first one or more devices is registered;
   initiating communication with the first one or more devices such that the communication is initiated with each device not more than one time by at least
      matching the one or more correlation identities associated with the first one or more devices to at least one matching correlation identity, the at least one matching correlation identity associated with different access technologies in a particular device of the first one or more devices, wherein the different access technologies comprise packet switched and circuit switched access technologies, and
      initiating communication via only one of the different access technologies associated with the particular device having the at least one matching correlation identity; and
   determining, based on the one or more correlation identities, that a second one or more devices registered to the user is registered via both circuit switched and packet switched access technologies; and
   setting up the communication to the second one or more devices via one of the circuit switched and the packet switched access technologies.

10. The computer program product of claim 9, wherein the operations further comprise:

implementing one of the functions of forking and parallel ringing to reach the user via the first one or more devices registered to the user.

11. The computer program product of claim 9, wherein the operations comprise:

transmitting one or more requests including a correlation identity to set up the communication with the user.

12. The computer program product of claim 11, wherein the operations comprise:

transmitting the one or more requests to a session handling entity.

* * * * *